United States Patent
Saleh et al.

(10) Patent No.: US 10,151,376 B2
(45) Date of Patent: Dec. 11, 2018

(54) TORQUE CONVERTER INCLUDING TURBINE PISTON AND MULTI-PLATE CLUTCH ASSEMBLY

(71) Applicant: Schaeffler Technologies AG & Co. KG, Herzogenaurach (DE)

(72) Inventors: Adam Saleh, Westerville, OH (US); Justin Clark, Ravenna, OH (US); Drew Hilty, Wooster, OH (US); Jeremy Vanni, Wooster, OH (US); Matthew Payne, Glenmont, OH (US); Larry Chad Boigegrain, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/482,627

(22) Filed: Apr. 7, 2017

(65) Prior Publication Data

US 2018/0291992 A1 Oct. 11, 2018

(51) Int. Cl.
*F16H 45/02* (2006.01)
*F16H 41/28* (2006.01)
*F16D 13/52* (2006.01)

(52) U.S. Cl.
CPC ............ *F16H 45/02* (2013.01); *F16H 41/28* (2013.01); *F16D 13/52* (2013.01); *F16H 2045/0221* (2013.01); *F16H 2045/0284* (2013.01)

(58) Field of Classification Search
USPC ........................................................ 192/3.29
See application file for complete search history.

(56) References Cited

U.S. PATENT DOCUMENTS

| 2,943,516 | A | * | 7/1960 | Herndon | F16D 33/00 |
| | | | | | 192/3.23 |
| 2,992,713 | A | * | 7/1961 | Stump | F16H 61/14 |
| | | | | | 192/3.33 |
| 3,126,079 | A | * | 3/1964 | Howard | F16H 45/02 |
| | | | | | 192/3.33 |
| 4,493,402 | A | * | 1/1985 | Hattori | F16H 45/02 |
| | | | | | 192/3.26 |
| 2015/0021137 | A1 | | 1/2015 | Lindemann et al. | |
| 2015/0152951 | A1 | | 6/2015 | Rentfrow | |
| 2016/0084364 | A1 | | 3/2016 | Ramsey et al. | |
| 2016/0160975 | A1 | * | 6/2016 | Depraete | F16H 45/02 |
| | | | | | 192/3.29 |

* cited by examiner

*Primary Examiner* — Robert W Hodge
*Assistant Examiner* — Ryan P Dodd
(74) *Attorney, Agent, or Firm* — Davidson, Davidson & Kappel, LLC

(57) ABSTRACT

A torque converter is provided. The torque converter includes an impeller including a plurality of impeller blades and a radially extending wall radially outside of the impeller blades and a turbine piston axially movable with respect to the impeller. The turbine piston includes a plurality of turbine blades and an outer radial extension radially outside of the turbine blades. The torque converter also includes a clutch assembly axially between the radially extending wall of the impeller and the outer radial extension of the turbine piston. The clutch assembly includes a first clutch plate rotationally fixed to the impeller and a second clutch plate rotationally fixed to the turbine piston. A portion of the clutch assembly extends between the turbine blades or the impeller blades. A method of constructing a torque converter is also provided.

20 Claims, 5 Drawing Sheets

TORQUE CONVERTER INCLUDING TURBINE PISTON AND MULTI-PLATE CLUTCH ASSEMBLY

The present disclosure relates generally to torque converters and more specifically to torque converters with a turbine piston.

BACKGROUND

U.S. Pub. 2015/0152951 discloses a torque converter including a turbine piston, known as an iTC, having a multi-plate integrated clutch. U.S. Pub. 2015/0021137 discloses an iTC with a cone clutch. U.S. Pub. 2016/0084364 discloses an iTC with diaphragm springs with tabs extending between turbine blades.

SUMMARY OF THE INVENTION

A torque converter is provided. The torque converter includes an impeller including a plurality of impeller blades and a radially extending wall radially outside of the impeller blades and a turbine piston axially movable with respect to the impeller. The turbine piston includes a plurality of turbine blades and an outer radial extension radially outside of the turbine blades. The torque converter also includes a clutch assembly axially between the radially extending wall of the impeller and the outer radial extension of the turbine piston. The clutch assembly includes a first clutch plate rotationally fixed to the impeller and a second clutch plate rotationally fixed to the turbine piston. A portion of the clutch assembly extends between the turbine blades or the impeller blades.

A method of constructing a torque converter is also provided. The method includes providing an impeller including a plurality of impeller blades and a radially extending wall radially outside of the impeller blades; providing a turbine piston axially movable with respect to the impeller, the turbine piston including a plurality of turbine blades and an outer radial extension radially outside of the turbine blades; and installing a clutch assembly axially between the radially extending wall of the impeller and the outer radial extension of the turbine piston by rotationally fixing a first clutch plate to the impeller and rotationally fixing the second clutch plate to the turbine piston such that a portion of the clutch assembly extends between the turbine blades or the impeller blades.

BRIEF DESCRIPTION OF THE DRAWINGS

The present invention is described below by reference to the following drawings, in which.

DETAILED DESCRIPTION

The disclosure provides embodiments of iTCs including multiple clutch plates, with one of the clutch plates being rotationally fixed to the turbine and another of the clutch plates being fixed to the impeller/rear housing cover.

In one embodiment, the multi-plate clutch configuration includes a laser welded clutch ring welded to the impeller and having a friction surface, and a brazed clutch ring connecting the turbine piston and the middle clutch plate. The brazed clutch ring is slotted to fit in between the blades. Such an embodiment can provide increased clutch capacity and clutch controllability for iTCs.

For other embodiments, the multi-plate clutch configuration is cone clutch in which extended impeller blades and a clutch plate with slots for installation over the impeller blades. The clutch plate transmits ⅔ engine torque through the impeller blades. Further cone clutch embodiments are also provided.

Figure 1:
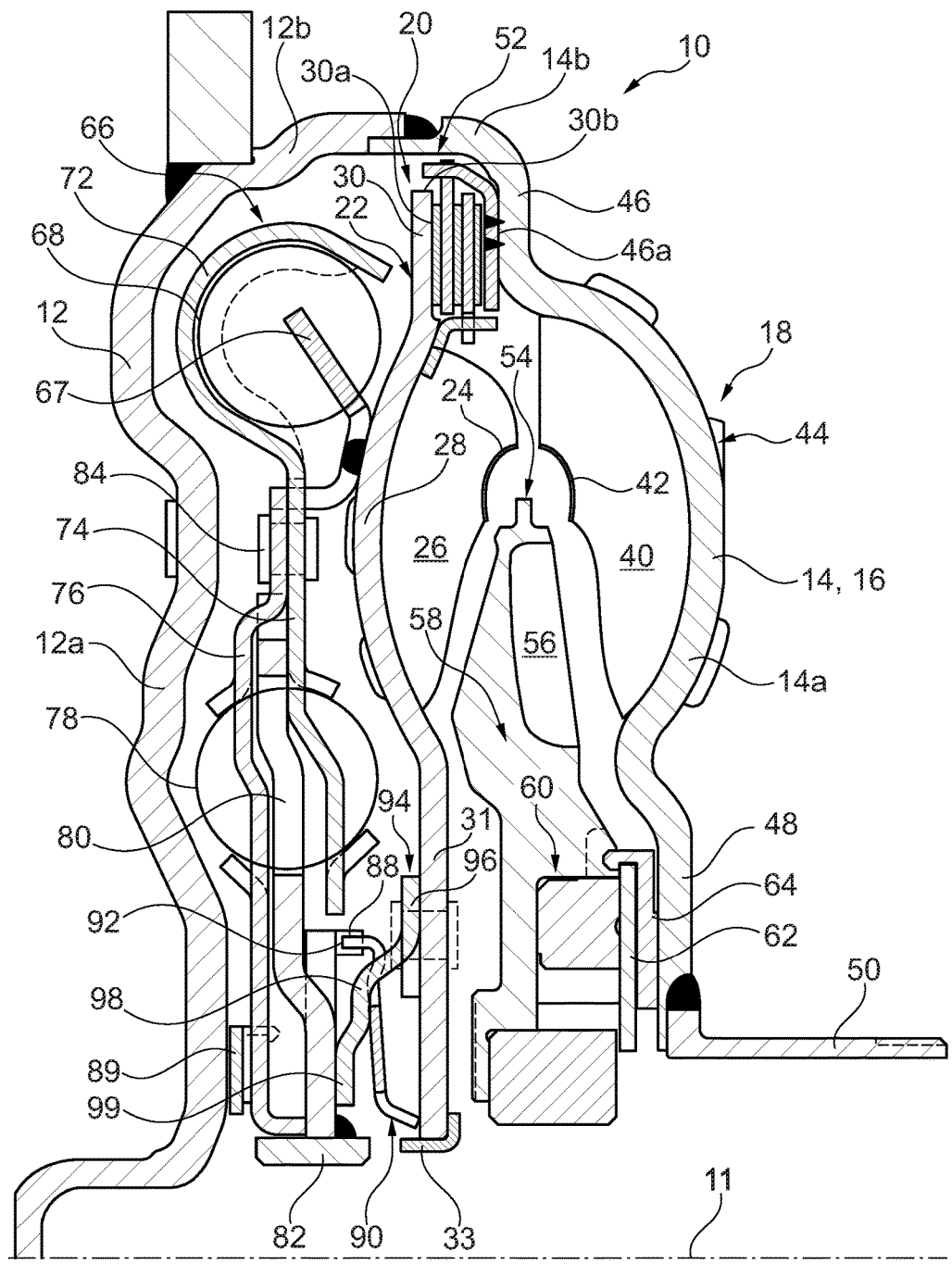
FIG. 1 shows a cross-sectional side view of an iTC torque converter in accordance with an embodiment of the present invention.

FIG. 1 shows a cross-sectional side view of an iTC torque converter 10 in accordance with an embodiment of the present invention. Torque converter 10 is rotatable about a center axis 11 and includes a front cover 12 for connecting to a crankshaft of an internal combustion engine and a rear cover 14 forming a shell 16 of an impeller or pump 18. The terms axially, radially and circumferentially as used herein are used with respect to center axis 11. Front cover 12 is substantially cup-shaped and includes a radially extending section 12a that intersects and extends radially away from center axis 11 and an annular axially extending section 12b that protrudes axially at an outer circumference of section 12a. Rear cover 14 is similarly cup-shaped and includes a radially extending section 14a that forms impeller shell 16 and an annular axially extending section 14b that protrudes axially at an outer circumference of radially extending section 14a.

Torque converter 10 also includes a turbine 20 configured to define a piston that is axially moveable toward and away from impeller 18 to engage and disengage an impeller clutch portion of impeller 18 so as to form a lockup clutch. Turbine 20 includes a turbine shell 22 and a core ring 24 supporting a plurality of turbine blades 26 therebetween. Turbine shell 22 includes a rounded blade supporting portion 28, which is shaped as an annular bowl, for contacting engine side edges of turbine blades 26. Radially inside of blade supporting portion 28, turbine shell 22 includes an annular inner radial extension 31 whose inner circumferential surface contacts an outer circumferential surface of a hub bushing 33 having an L-shaped cross-section that for contacting an outer circumferential surface of a transmission input shaft such that turbine 20 is rotatable with respect to the transmission input shaft.

Radially outside of blade supporting portion 28 and turbine blades turbine blades 26, an outer radial extension 30, which forms the piston, radially protrudes outwardly from an outer circumference of blade supporting portion 28 to define an annular protrusion having a flat annular radially extending impeller facing surface 30a and having an outermost circumference that defines an outermost circumferential surface 30b of turbine 20. Accordingly, the piston and turbine shell 22 are formed as a single piece.

Figure 2:
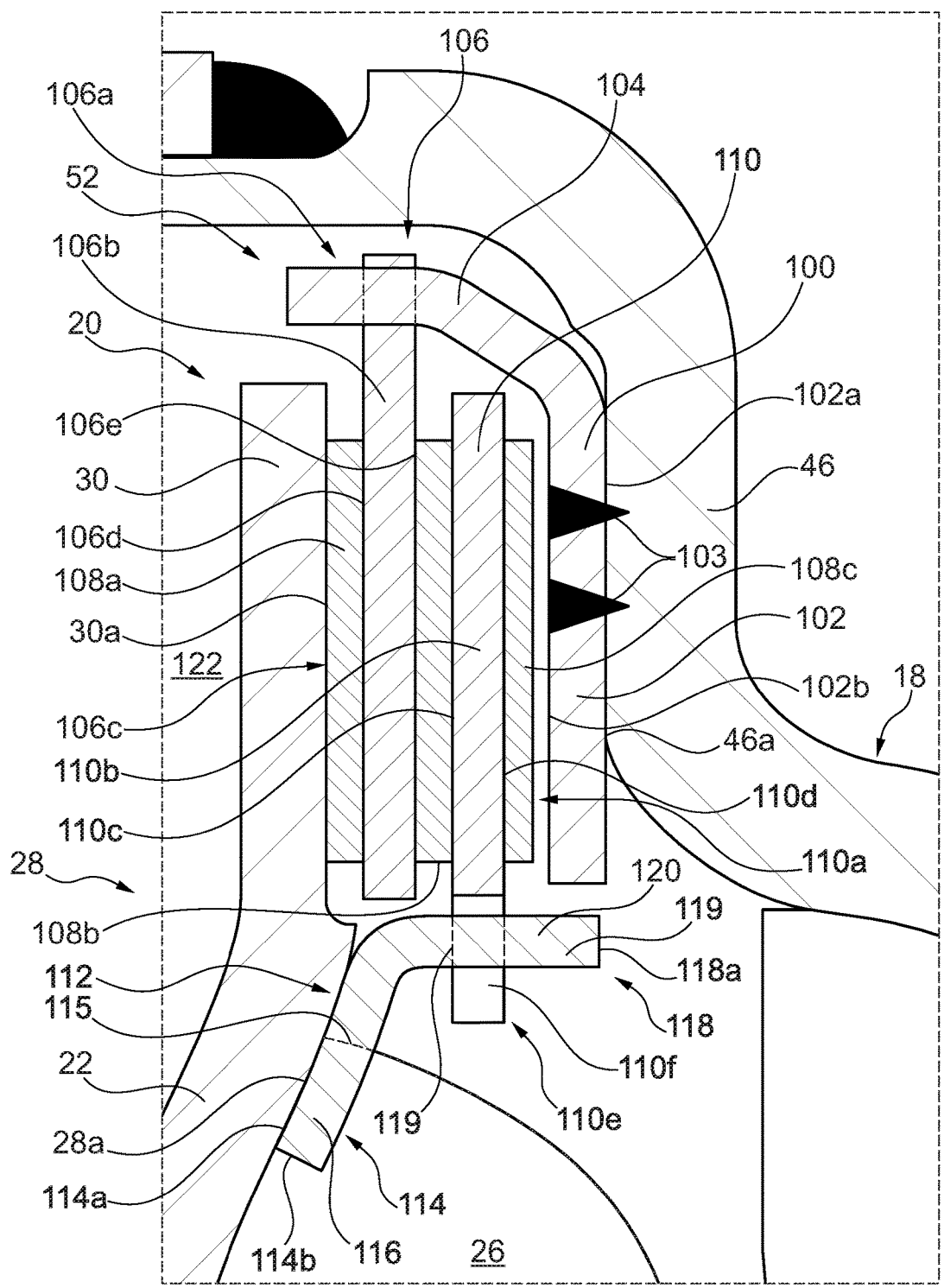
FIG. 2 shows an enlarged view of the lockup clutch of the torque converter shown in FIG. 1.

Impeller 18 includes impeller blades 40, which are each fixed at a transmission side thereof to impeller shell 16 and are each fixed to an impeller core ring 42 at an engine side thereof by tabs. Impeller shell 16, at radially extending section 14a of rear cover 14, includes a rounded blade supporting portion 44, which is shaped as an annular bowl, for contacting transmission side edges of impeller blades 40. Radially outside of blade supporting portion 32 and impeller blades 40, radially extending section 14a includes a radially extending wall 46 radially protrudes outwardly from an outer circumference of rounded blade supporting portion 44 to define an annular wall having a flat annular radially extending turbine facing surface 46a. Radially inside of blade supporting portion 44, impeller shell 16 includes an annular inner radial extension 48 extending radially inward from blade supporting portion 44. A radially inner end of extension 48 is connected to an impeller hub 50. A clutch assembly 52, which is described further below with respect to FIG. 2, is provided axially between radial extension 30 and wall 46 for rotationally connecting turbine piston 20 to impeller shell 16 to form a lockup clutch of torque converter 10.

Torque converter 10 also includes a stator 54 axially between turbine 20 and impeller 18 to redirect fluid flowing from the turbine blades 26 before the fluid reaches impeller 18 to increase the efficiency of torque converter 10. Stator 54 includes a stator casting including a plurality of blades 56 and a stator body 58. Stator 54 also includes a one-way clutch 60 held within stator body 58 by a centering plate 62. Stator 54 is connectable to a stator shaft by one-way clutch 60 for rotation in one rotational direction about center axis 11. An axial thrust washer 64, which is axially between stator 54 and impeller 18, is fixed to stator 54 at an outer circumference of centering plate 62.

A damper assembly 66 is positioned between front cover 12 and turbine 20 and is configured for transferring torque from turbine 20 to a transmission input shaft. In this embodiment, damper assembly 66 is connected to the turbine piston 20 for rotation therewith by drive tabs 67, which are fixed to blade supporting portion 28, circumferentially engaging a radially outer set of springs 68 of damper assembly 66. Drive tabs 67 are circumferentially spaced from each other and extend into spaces formed circumferentially between springs 68 to contact circumferential edges of springs 68. Springs 68 are retained by a spring retainer 72 that wraps around a contour of the outer diameter of springs 68 and is formed at a radially outer end of a first or turbine side cover plate 74 of damper assembly 66. Damper assembly 66 further includes a second or front cover side cover plate 76.

Cover plates 74, 76 support a set of radially inner springs 78, which are radially inside of springs 68, axially therebetween. Damper assembly 66 also includes a drive flange 80 positioned axially between cover plate 74, 76 including a hub 82 at a radially inner end thereof configured for non-rotatably connecting to a transmission input shaft. Radially outside of springs 78, cover plates 74, 76 are fixed together by a plurality of circumferentially spaced rivets 84. Drive flange 80 includes circumferentially extending slots for receiving springs 68 formed therein. Radially inside of springs 68, drive flange 80 is provided with a plurality of surfaces 88 formed as ramps. A thrust washer 89 is provided at a front cover side of second cover plate 76 to contact an inner surface of front cover 12 to prevent cover plate 76 from frictionally engaging front cover 12 during rotation thereof about axis 11.

A turbine-side bias spring 90, which in this embodiment is a diaphragm spring, is provided axially between flange 70 and inner radial extension 31 of turbine 20. At an inner diameter end thereof, bias spring 90 is configured for contacting a front cover side surface of inner radial extension 31. At an outer diameter end thereof, bias spring 90 includes a plurality of axially extending drive flange engaging tabs, each provided with a ramp contacting surface 92 at a side thereof formed as ramps for contacting a respective one of ramps 88 of drive flange 70. Each ramp 88 contacts one of surfaces 92 such that relative circumferential motion between drive flange 70 and bias spring 90 causes contact between the ramps 88 and surfaces 92 to generate a force on turbine piston 20. When damper assembly 66 travels into the coast direction, ramps 88 contact surfaces 92 to produce an axial force that is transmitted by bias spring 90 to turbine piston 20.

A spacer plate 94 capturing diaphragm spring 90 is fixed to inner radial extension 31 of turbine 20. Spacer plate 94 includes an outer annular base section 96 contacting front cover side surface 31a of inner radial extension 31 and a plurality of circumferentially spaced fingers 98 protruding axially away from and radially inward from base section 96 and extending axially through spaces circumferentially between the diaphragm engaging tabs of spring 90 to contact a front cover side surface of diaphragm spring 90 to prevent diaphragm spring 90 from moving axially away from turbine 20. A front cover side surface of inner base section 99 of spacer plate 94 contacts a turbine side surface of drive flange 70.

FIG. 2 shows an enlarged view of the lockup clutch of torque converter 10 shown in FIG. 1. Clutch assembly 52 includes an outer support 100 fixed to surface 46a of wall 46. In a preferred embodiment, outer support 100 is formed by a ring extending continuously about center axis 11, but in other embodiments, outer support 100 can be formed by a plurality of segments that are spaced circumferentially from each other about center axis 11. Outer support 100 includes a radially extending portion 102 having a rear radially extending surface 102a in flush contact with surface 46a. In a preferred embodiment, radially extending portion 102 is laser welded to wall 46 such that surface 102a is joined to surface 46a at welds 103. After the welding, a front radially extending surface 102b of outer support 100 is face machined to allow for frictional clutch engagement with an adjacent clutch plate 110. Outer support 100 further includes an axially extending portion 104 protruding axially away from wall 46 at a radially outer end of radially extending portion 102. Axially extending portion 104 supports a radially outer end 106a of a first clutch plate 106, more specifically a radially outer end of a base plate 106b of a first clutch plate 106, such that clutch plate 106 is rotationally fixed to outer support 100 and axially slidable with respect to outer support 100. First clutch plate 106 is provided axially between a second clutch plate 110 and outer radial extension 30. Base plate 106b, at a radially inner portion 106c of clutch plate 106, is provided with a first friction material 108a on a front radially extending surface 106d of base plate 106b and is provided with a second friction material 108b on a rear radially extending surface 106e of base plate 106b. First friction material 108a is arranged for frictionally engaging surface 30a of outer radially extension 30 during clutch lockup.

Second clutch plate 110 is provided axially between outer support 100 and first clutch plate 106, more specifically a radially outer portion 110a of clutch plate 110 is axially between radially extending portion 102 of outer support 100 and radially inner portion 106c of clutch plate 106. Second friction material 108b is arranged for frictionally engaging a front radially extending surface 110c of a base plate 110b of second clutch plate 110. Base plate 110b, at outer portion 110a, is provided with a friction material 108c on a rear radially extending surface 110d of base plate 110b. Friction material 108c is arranged for frictionally engaging front radially extending surface 102b of radially extending portion 102 of outer support 100 during clutch lockup. Friction material 108a, 108b, 108c may be formed of any known wet friction material, for example a fiber matrix impregnated with resin, and base plates 106c, 110b may be formed of metal, for example stainless steel. In other embodiments, instead of fixing friction material 108a, 108b to base plate 106b and fixing friction material 108c to base plate 110b, friction material 108a can be fixed to surface 30a and/or friction material 108b can be fixed to surface 110c of base late 110b and/or friction material 108c can be fixed to surface 102b.

Clutch assembly 52 includes an inner support 112 fixed at a front cover side 28a of blade supporting portion 28. In a preferred embodiment, inner support 112 is formed by a ring extending continuously about center axis 11 (FIG. 1), but in other embodiments, inner support 112 can be formed by a plurality of segments that are spaced circumferentially from each other about center axis 11. Inner support 112 includes a radially extending portion 114 having a front radially extending surface 114a in flush contact with surface 28a. In the preferred embodiment, radially extending portion 114 is brazed to turbine shell 22 at surface 28a. Radially extending portion 114 is provided with a plurality of circumferentially spaced radially extending slots 115, each extending radially outward from an inner circumferential surface 114b of radially extending portion 114 and receiving one of the turbine blades 26. Slots 115 define a plurality of circumferentially spaced tabs 116 therebetween, such that tabs 116 intermesh with blades 26 with each of tabs 116 being circumferentially between two blades 26. In this embodiment, torque is transmitted from inner support 112 to turbine shell 22 solely through the brazing.

Inner support 112 further includes an axially extending portion 118 protruding axially away from turbine shell 22 at a radially outer end of radially extending portion 114. Axially extending portion 118 is configured for supporting a radially inner end 110e of second clutch plate 110 such that clutch plate 110 is rotationally fixed to inner support 112 and axially slidable with respect to inner support 112. Axially extending portion 118 is provided with a plurality of circumferentially spaced axially extending slots 119, each extending axially from a free end 118a of axially extending portion 118 toward turbine shell 22 and receiving one of a plurality of radially extending tabs 110f of radially inner end 110e of clutch plate 110. Slots 119 define a plurality of circumferentially spaced and axially extending tabs 120 therebetween, such that each of tabs 110f is circumferentially between two tabs 120.

During lockup of clutch assembly 52 during the operation of torque converter 10, turbine piston 20 is forced axially toward impeller 18 via pressure in a region 122 at a front side of turbine piston 20. Rear surface 30a of outer radial extension 30 contacts friction material 108a and forces clutch plate 106 into clutch plate 110, such that friction material 108b contacts surface 110c of clutch plate 110. Clutch plate 110 is in turn forced into radially extending portion 102 of outer support 100, such that friction material 108c contacts radially extending surface 102b. Accordingly, during lockup, turbine piston 20 forces clutch plates 106, 110 into outer support 100, such turbine piston 20 is frictionally engaged with impeller 18 via clutch plates 106, 110. In other words, during lockup, the pressure force in region 122 sandwiches plates 106, 110 between outer radial extension 30 and wall 46 such that turbine piston 10 and impeller 18 are temporarily fixed rotationally by the frictional engagement of friction material 108a, 108b, 108c with the adjacent radially extending surfaces 30a, 110c, 102b.

Figure 3:
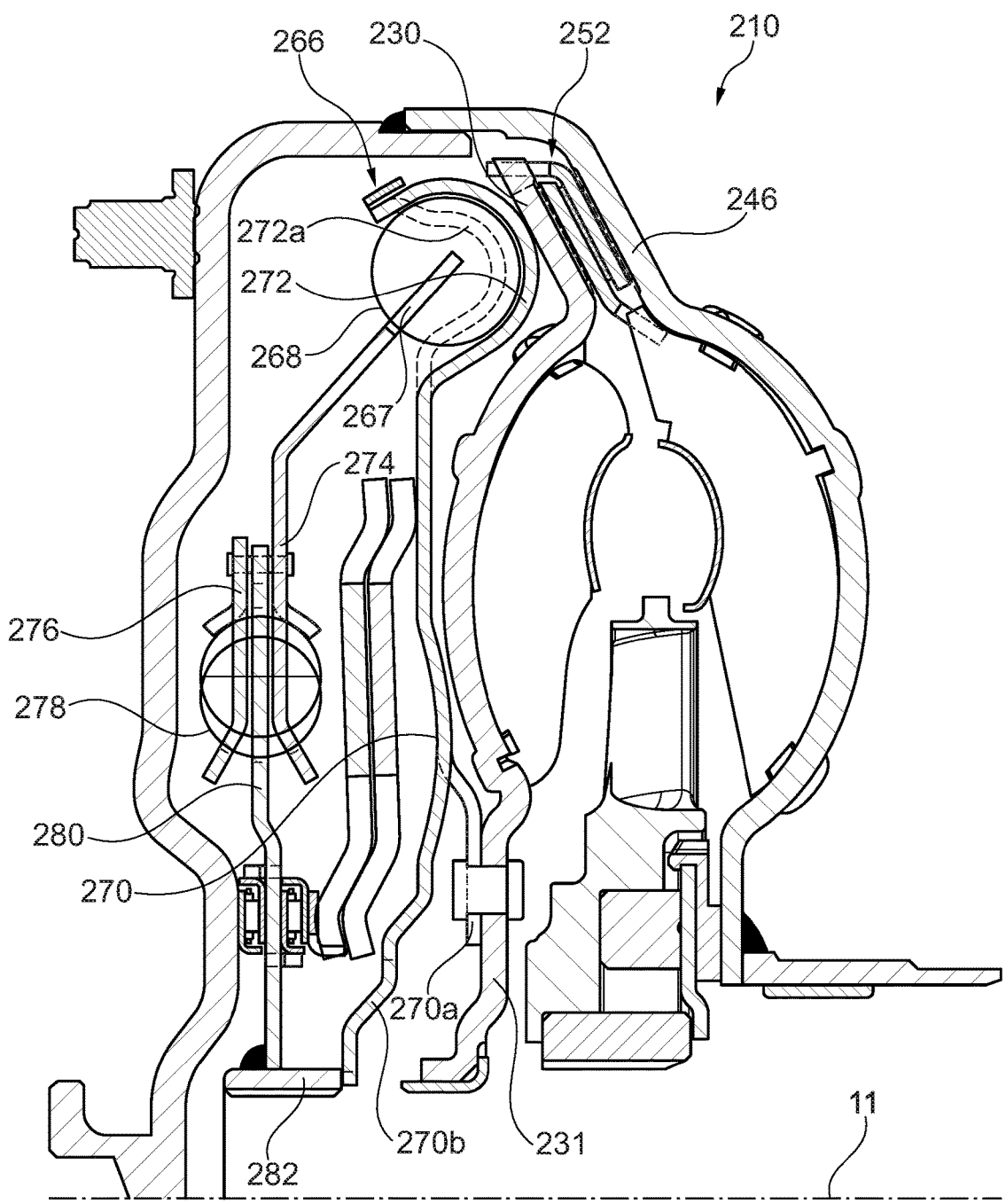
FIG. 3 shows a torque converter in accordance with another embodiment of the present invention.

FIG. 3 shows a torque converter 210 including a turbine piston 220 in accordance with another embodiment of the present invention. Torque converter 210 is similar to torque converter 10 of FIGS. 1 and 2, but with outer radial extension 230, radially extending wall 246 and clutch assembly 252 being cone shaped. Additionally, torque converter 210 includes a damper assembly 266 that is different from damper assembly 66. Unlabeled components of torque converter 210 are to be understood as being the same as the corresponding components of torque converter 10.

Damper assembly 266 includes a spring retainer 272 formed at the end of a plate 270, which splits into a first portion 270a that is riveted to an inner radial extension 231 of turbine shell 222 and a second portion 270b that contacts drive hub 282. A radially outer set of springs 268 is driven by abutments of 272a of spring retainer 272 and springs 268 in turn drive tabs 267 formed at the radially outer end of a first cover plate 274. First cover plate 274 and a second cover plate 276 retain and drive a radially inner set of springs 278 that drive a drive flange 280 that is fixed to drive hub 282, which is configured for driving a transmission input shaft.

Figure 4:
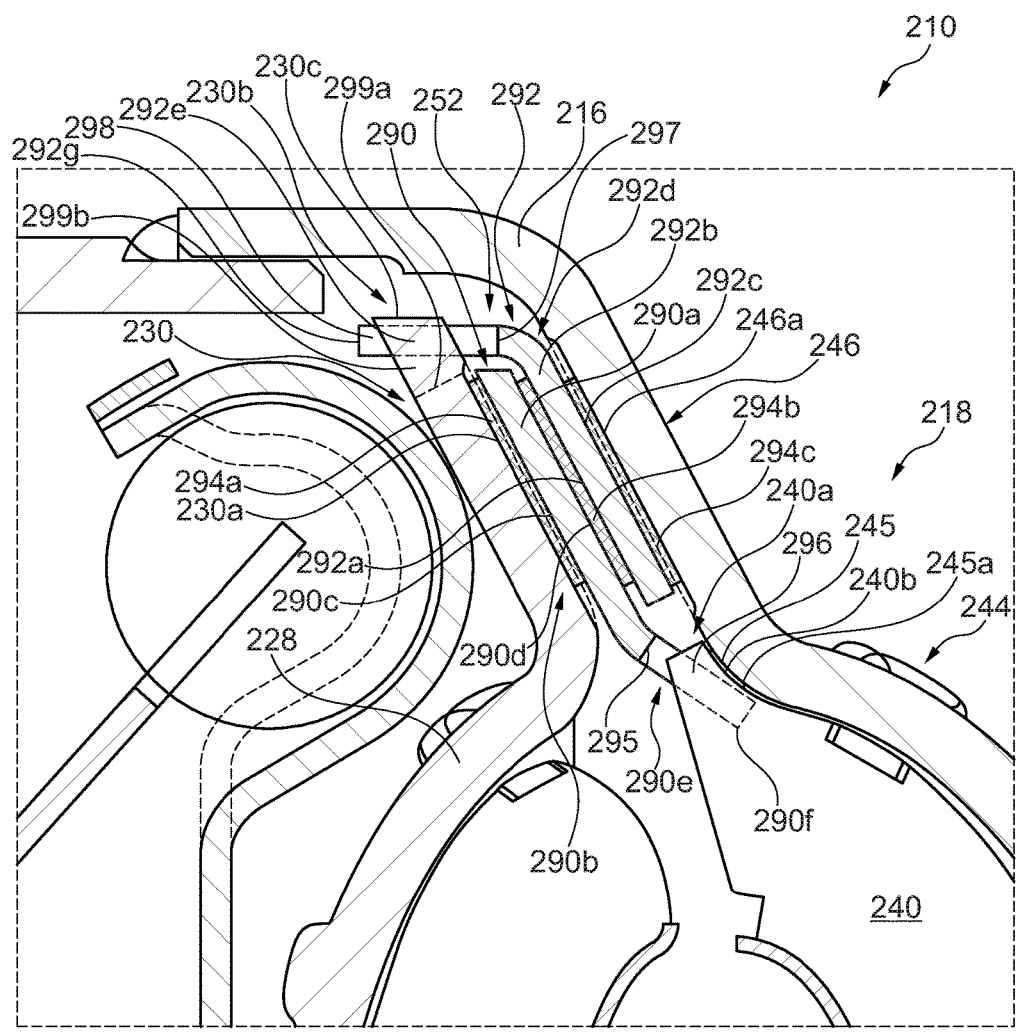
FIG. 4 shows an enlarged view of the lockup clutch of the torque converter shown in FIG. 3.

FIG. 4 shows an enlarged view of the lockup clutch of torque converter 210 shown in FIG. 3. Clutch assembly 252 includes a first clutch plate 290 and a second clutch plate 292, with first clutch plate being axially between outer radial extension 230 and second clutch plate 292, and second clutch plate begin axially between first clutch plate 290 and radially extending frustoconical wall 246. First clutch plate 290 includes a base plate 290a, which at a radially outer portion 290b of clutch plate 290 is provided with a first friction material 294a on a front radially extending frustoconical surface 290c of base plate 290a and is provided with a second friction material 294b on a rear radially extending frustoconical surface 290d of base plate 290a. First friction material 294a is arranged for frictionally engaging a rear radially extending frustoconical surface 230a of outer radial extension 230 during clutch lockup. Second friction material 294b is arranged for frictionally engaging a front radially extending frustoconical surface 292a of a base plate 292b of second clutch plate 292. The bonding of friction material 294a, 294b to both radially extending surfaces 290c, 290d of clutch plate 290 provides superior thermal heat dissipation. At a rear radially extending frustoconical surface 292c, base plate 292b is provided with a friction material 294c for frictionally engaging a front radially extending frustoconical surface 246a of radially extending frustoconical wall 246.

At radially inner end 290e thereof, base plate 290a is rotationally fixed to impeller 218 via impeller blades 240 such that clutch plate 290 is axially slidable with respect to impeller blades 240. Each impeller blade 240 is received in a corresponding slot 295 in radially inner end 290e and slots 295 define a plurality of tabs 296 at radially inner end 290e, with each impeller blade 240 being circumferentially between two tabs 296 such that tabs 296 form fingers that intermesh with impeller blades 240. Slots 295 extending from an inner diameter surface 290f of base plate 290a radially outward. Tabs 296 extend axially and radially away from radially outer portion 290b of clutch plate 290 such that the rear side surfaces of radially outer portion 290b and tabs 296 form an obtuse angle with respect to each other. Radially outer ends 240a of blades 240, i.e., fluid flow outlet regions of blades 240, which are circumferentially aligned with and contact tabs 296, are configured to extend slightly radially outside of rounded blade supporting portion 244 and follow a path of wall 246. In other words, radially outer ends 240a at a rear side thereof each define a concave surface 240b that contours to the shape of a convex surface 245 at a front side of impeller shell 216 that forms a transition between blade supporting portion 244 and radially extending frustoconical wall 246. In a preferred embodiment, radially outer ends 240a are joined to impeller shell 216 by a braze material 245a, which can be specifically provided to join concave surface 240b and convex surface 245 together. Radially outer ends 240a are advantageous for joining to impeller shell 216, as radially outer ends 240a are a low stress area of blades 240.

At radially outer end 292d thereof, base plate 292b is rotationally fixed to outer radial extension 230 such that clutch plate 292 is axially slidable with respect to outer radial extension 230. More specifically, at radially outer end 292d, base plate 292b includes an axially extending portion 292e extending axially away from wall 246. Axially extending portion 292e includes a plurality of circumferentially spaced axially extending slots 297 formed there that define a plurality of circumferentially spaced tabs 298 circumferentially between slots 297. Slots 297 extend axially from a free end 292g of axially extending portion 292e toward wall 246. Outer radial extension 230, at an outer radial end 230b thereof, is provided with a plurality of radially extending slots 299a circumferentially spaced from each other and extending radially inward from outer diameter surface 230c of outer radial extension 230. Slots 299a define a plurality of radially extending tabs 299b with axially extending tabs 298 each passing axially through one of slots 299a and radially extending tabs 299b each extending radially through one of slots 297 such tabs 299b and tabs 298 are intermeshed together and rotationally engage each other to rotationally fix clutch plate 292 to outer radial extension 230.

During clutch lockup, a first fraction of engine torque is transferred from impeller shell 216 to turbine piston 220 via friction material 294c, while a second fraction of torque is transferred from impeller shell 216 to turbine piston via blades 240. In a preferred embodiment, the second fraction is greater than the first fraction. In an especially preferred embodiment, the second fraction is ⅔ and the first fraction is ⅓. More specifically, the first fraction of engine torque is transferred from impeller shell 216 to turbine piston 220 via wall 246a frictionally engaging friction material 294c. The second fraction of engine torque is transferred in the form of a third fraction and fourth fraction, with each of the third and fourth fractions being ½ of the second fraction and ⅓ of the engine torque. The second fraction is transferred from impeller shell 216 to turbine piston 220 via braze material 245a transferring torque from impeller shell 216 to impeller blades 240, which in turn is transferred to clutch plate 290 via tabs 296. The third fraction is transferred by clutch plate 290 to turbine piston 220 by frictionally engaging outer radial extension 230 via first friction material 294a. The fourth fraction is transferred from impeller shell 216 to turbine piston 220 via braze material 245a transferring torque from impeller shell 216 to impeller blades 240, which in turn is transferred to clutch plate 290 via tabs 296, and is transferred by clutch plate 290 to clutch plate 292 via second friction material 294b, then finally is transferred by tabs 298 of clutch plate 292 to turbine piston 220 via tabs 299b of outer radial extension 230.

Figure 5:
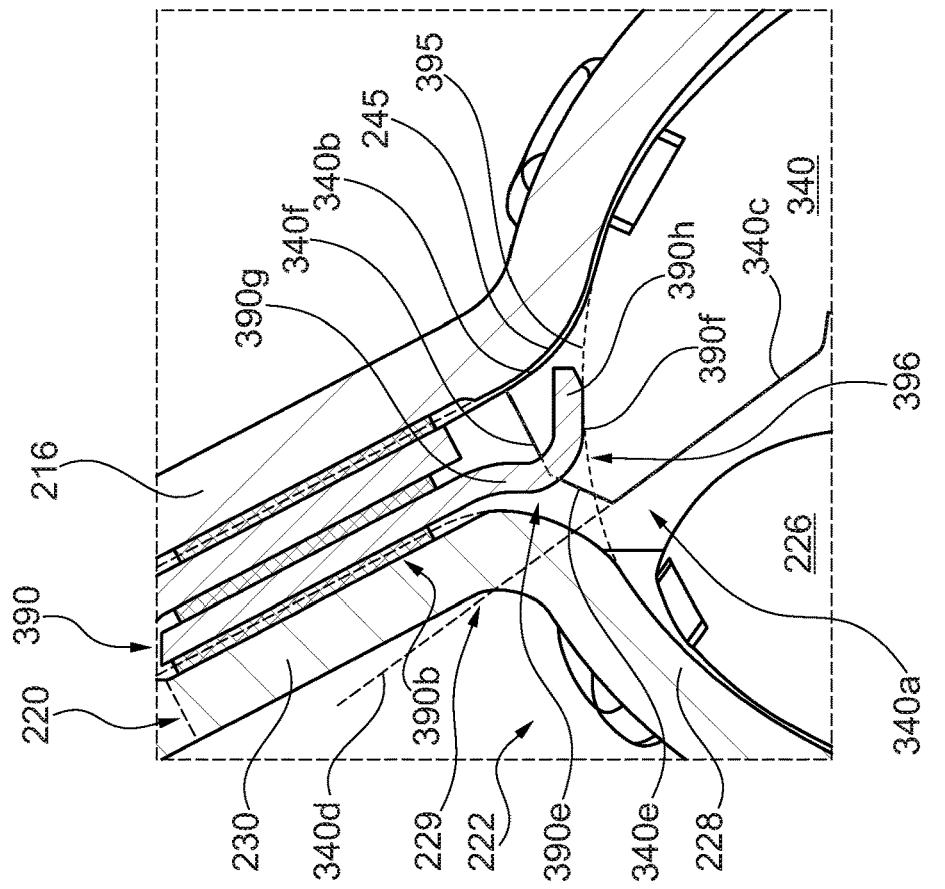
FIG. 5 shows an alternative to the embodiment of FIGS. 3 and 4.

FIG. 5 shows an alternative to the embodiment of FIGS. 3 and 4. FIG. 5 differs from the embodiment of FIG. 4 only in that it includes a clutch plate 390 having a radially inner end 390e that differs from that of clutch plate 290 and impeller blades 340 that differ from impeller blades 240. Radially outer ends 340a of impeller blades 340 are axially thicker than impeller blades 240, thus reducing the fluid flow gap between blades 240 and turbine piston 222 as much as possible. A rear side edge 340c of blades 340, which directly faces turbine blades 226, extends in a plane 340d that intersects turbine piston 220. More specifically, plane 340d intersects turbine piston 220 at a transition region 229 where blade supporting portion 228 of turbine shell 222 transitions into outer radial extension 230. Rear side edge 340c at an outer diameter end thereof joins an edge 340e facing transition region 229. Edge 340e then joins an outer diameter edge 340f of blade 340, with edge 340f connecting to a concave surface 340b that is contoured to the convex surface 245 of impeller shell 216. Blades 340 are brazed to impeller shell 216 at surfaces 340b, 245.

Radially inner end 390e of clutch plate 390 includes circumferentially spaced tabs 396 that each include a rounded portion 390g that extends radially inward from outer portion 290b into an axially extending portion 390h that defines an inner diameter surface 390f of clutch plate 390. Tabs 396 extend into spaces circumferentially between blades 340 such that rounded portions 390g are aligned with points where edges 340e, 340f merge and axially extending portions 390h contact circumferentially facing surfaces of blades 340. In a known manner, blade supporting portion 228 of turbine shell 222 and rounded blade supporting portion 244 of impeller shell 216 define a torus, having a profile illustrated by a curved line 395 connecting a contour of blade supporting portion 228 and a contour of rounded blade supporting portion 244. Clutch plate 390 is arranged such that tabs 396 are arranged outside of curved line 395. In the embodiment shown in FIG. 5, inner diameter surface 390f is shaped to align with line 395.

Figure 6:
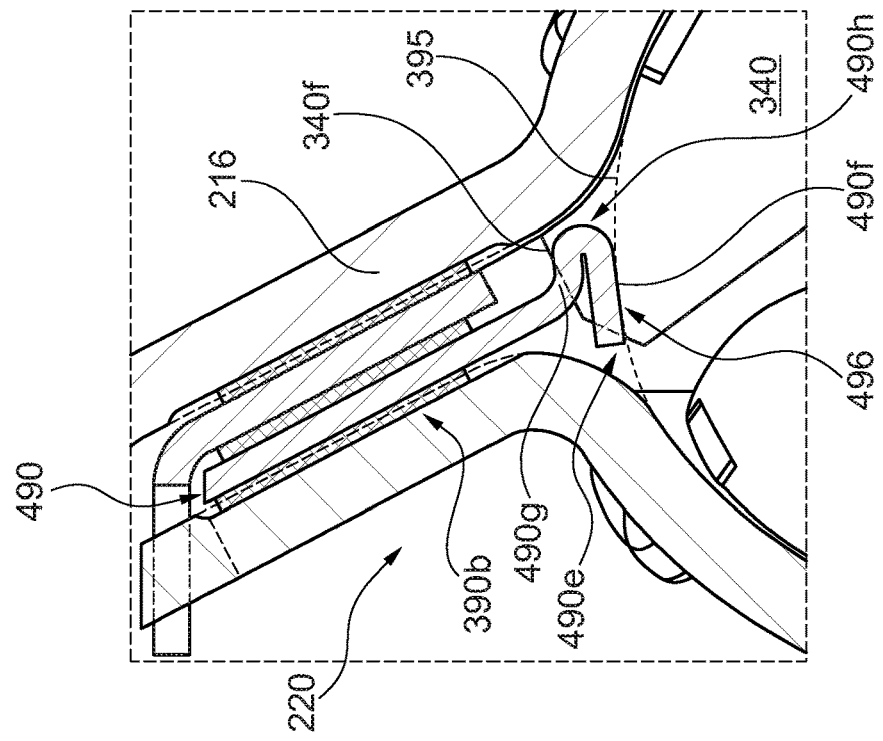
FIG. 6 shows another alternative to the embodiment of FIGS. 3 and 4.

FIG. 6 shows another alternative to the embodiment of FIGS. 3 and 4. FIG. 6 differs from the embodiment of FIG. 5 only in that it includes a clutch plate 490 having a radially inner end 490e that differs from that of clutch plate 390. Radially inner end 490e of clutch plate 490 includes circumferentially spaced tabs 496 that each include a rounded portion 490g that extends radially inward from outer portion 290b into an axially extending folded portion 490h that first extends toward impeller shell 216, but then is bent back toward turbine piston 220 to define an inner diameter surface 490f of clutch plate 490. Tabs 496 extend into spaces circumferentially between blades 340 such that rounded portions 490g are aligned with edges 340f and axially extending folded portions 490h contact circumferentially facing surfaces of blades 340. Similar to the embodiment of FIG. 5, clutch plate 490 is arranged such that tabs 496 are arranged outside of curved line 395. In the embodiment shown in FIG. 6, inner diameter surface 490f is shaped to align with line 395.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A torque converter comprising:
    an impeller including a plurality of impeller blades and a radially extending wall radially outside of the impeller blades;
    a turbine piston axially movable with respect to the impeller, the turbine piston including a plurality of turbine blades and an outer radial extension radially outside of the turbine blades; and
    a clutch assembly axially between the radially extending wall of the impeller and the outer radial extension of the turbine piston, the clutch assembly including a first clutch plate rotationally fixed to the impeller and a second clutch plate rotationally fixed to the turbine piston, a radially inner portion of the clutch assembly extending into a space circumferentially between two of the turbine blades or into a space circumferentially between two of the impeller blades.

2. The torque converter as recited in claim 1 wherein the clutch assembly includes an inner support supporting the second clutch plate, the second clutch plate being rotationally fixed to and axially slidable along the inner support, the inner support including the radially inner portion of the clutch assembly extending into the space circumferentially between two of the turbine blades or into the space circumferentially between two of the impeller blades.

3. The torque converter as recited in claim 2 wherein the inner support includes a radially extending portion including a plurality of tabs, each of the tabs extending into a respective space circumferentially between two of the turbine blades, the radially inner portion being one of the tabs.

4. The torque converter as recited in claim 3 wherein the radially extending portion of the inner support is brazed to a turbine shell of the turbine piston.

5. The torque converter as recited in claim 3 wherein the inner support includes an axially extending portion protruding axially from the radially extending portion thereof, a radially inner end of the second clutch plate being axially slidable along the axially extending portion.

6. The torque converter as recited in claim 1 wherein the clutch assembly includes an outer support supporting the first clutch plate, the outer support being fixed to the radially extending wall.

7. A torque converter comprising:
an impeller including a plurality of impeller blades and a radially extending wall radially outside of the impeller blades;
a turbine piston axially movable with respect to the impeller, the turbine piston including a plurality of turbine blades and an outer radial extension radially outside of the turbine blades; and
a clutch assembly axially between the radially extending wall of the impeller and the outer radial extension of the turbine piston, the clutch assembly including a first clutch plate rotationally fixed to the impeller and a second clutch plate rotationally fixed to the turbine piston, a portion of the clutch assembly extending between the turbine blades or the impeller blades,
wherein the clutch assembly includes an outer support supporting the first clutch plate, the outer support being fixed to the radially extending wall,
wherein the outer support includes a radially extending portion fixed to a front radially extending surface of the radially extending wall by welds and an axially extending portion protruding axially from a radially outer end of the radially extending portion of the outer support, a radially outer end of the first clutch plate being axially slidable along the axially extending portion of the outer support.

8. The torque converter as recited in claim 7 wherein the second clutch plate is axially between the first clutch plate and the radially extending portion of the outer support and the first clutch plate is axially between the first clutch plate and the outer radial extension of the turbine piston.

9. The torque converter as recited in claim 1 wherein the first clutch plate includes a radially inner end including the radially inner portion of the clutch assembly extending into the space circumferentially between two of the turbine blades or into the space circumferentially between two of the impeller blades.

10. The torque converter as recited in claim 9 wherein the radially inner end of the first clutch plate includes a plurality of tabs, each of the tabs extending into a respective space circumferentially between two of the impeller blades at radially outer ends of the impeller blades, the radially inner portion being one of the tabs.

11. The torque converter as recited in claim 10 wherein the radially outer ends of the impeller blades are brazed to an impeller shell of the impeller.

12. The torque converter as recited in claim 1 wherein the second clutch plate includes an axially extending portion extending from a radially outer end of a radially extending portion of the second clutch plate, the axially extending portion being rotationally connected to the outer radial extension of the turbine piston.

13. The torque converter as recited in claim 12 wherein the axially extending portion of the second clutch plate includes a plurality of tabs that are intermeshed with tabs of the outer radial extension of the turbine piston.

14. A method of constructing a torque converter comprising:
providing an impeller including a plurality of impeller blades and a radially extending wall radially outside of the impeller blades;
providing a turbine piston axially movable with respect to the impeller, the turbine piston including a plurality of turbine blades and an outer radial extension radially outside of the turbine blades; and
installing a clutch assembly axially between the radially extending wall of the impeller and the outer radial extension of the turbine piston by rotationally fixing a first clutch plate to the impeller and rotationally fixing a second clutch plate to turbine piston such that a radially inner portion of the clutch assembly extends into a space circumferentially between two of the turbine blades or into a space circumferentially between two of the impeller blades.

15. The method as recited in claim 14 wherein the installing the clutch assembly includes rotationally fixing an inner support to the turbine piston to rotationally fix the second clutch plate to the turbine piston, the inner support including the radially inner portion of the clutch assembly extending into the space circumferentially between two of the turbine blades or into the space circumferentially between two of the impeller blades.

16. The method as recited in claim 15 wherein the inner support includes a radially extending portion including a plurality of tabs, each of the tabs extending into a respective space circumferentially between two of the turbine blades, the radially inner portion being one of the tabs, the installing the clutch assembly including brazing the radially extending portion of the inner support to a turbine shell of the turbine piston.

17. The method as recited in claim 16 wherein the installing the clutch assembly includes fixing an outer support to the radially extending wall and rotationally fixing the first clutch plate to the outer support.

18. The method as recited in claim 14 wherein the installing the clutch assembly includes rotationally fixing a radially inner end of the first clutch plate to the impeller blades, the radially inner end of the first clutch plate including the radially inner portion of the clutch assembly extending into the space circumferentially between two of the turbine blades or into the space circumferentially between two of the impeller blades, the radially inner end of the first clutch plate includes a plurality of tabs, each of the tabs extending into a respective space circumferentially between two of the impeller blades at radially outer ends of the impeller blades, the radially inner portion being one of the tabs.

19. The method as recited in claim 18 further comprising brazing the radially outer ends of the impeller blades to an impeller shell of the impeller.

20. The method as recited in claim 19 wherein the installing the clutch assembly includes rotationally fixing an axially extending portion of the second clutch plate to the outer radial extension of the turbine piston.

\* \* \* \* \*